Figure 1:
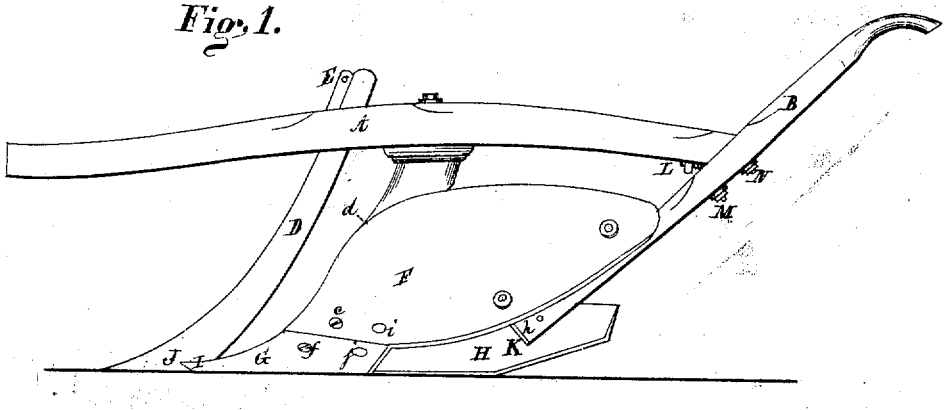

2 Sheets--Sheet 1.

M. L. GIBBS.

Improvement in Plows.

No. 4,965. Reissued July 9, 1872.

Witnesses.
J. C. Clifford
D. L. Humphrey.

Inventor.
Martin L. Gibbs.
Per Burridge & Co.
Attys

A.M. PHOTO-LITHOGRAPHIC CO. N.Y. (OSBORNE'S PROCESS.)

2. Sheets--Sheet 2.

M. L. GIBBS.

Improvement in Plows.

No. 4,965. Reissued July 9, 1872.

Witnesses
J. Clatlin
D. L. Humphrey

Inventor.
Martin L. Gibbs.
Per Burridge & Co.
Attys.

AM. PHOTO-LITHOGRAPHIC CO. N.Y. (OSBORNE'S PROCESS.)

UNITED STATES PATENT OFFICE.

MARTIN L. GIBBS, OF CANTON, OHIO.

IMPROVEMENT IN PLOWS.

Specification forming part of Letters Patent No. 108,699, dated October 25, 1870; reissue No. 4,965, dated July 9, 1872.

I, MARTIN L. GIBBS, of Canton, in the county of Stark, in the State of Ohio, have invented certain Improvements in Plows, of which the following is a specification:

*Nature and Objects of the Invention.*

The first part of my invention relates to the construction, by casting of iron, of a plow-standard with raised flanges or projections around the seats for the mold-board and share, respectively, and around the holes for the bolts by which these parts are made fast to the standard, and to the construction in like manner of the mold-board and share of corresponding formation—that is to say, with grooves and holes countersunk in the bearing faces of the mold-board and share—so that there shall be a mutual adaptation of these parts to their places on the standard, the result of which will be strength and durability; but the main object of this construction is that a cast-steel mold-board and share of similar general form, but as thin and as light as the superior toughness and strength of that material would render admissible, shall be bolted to the standard over these flanges without changing the form or position of the wearing faces of such mold-board and share, and consequently without changing the "set" or running of the plow; and the share might be changed without changing the mold-board, and vice versa. The second part of my invention relates to the construction in a like manner of a handle-flange on the land-side of such angular form as to afford a bearing for the upper edge of the lower end of the handle, as well as the lower and abutting end thereof itself, so that when the handle is pressed endwise it will be sustained by the metal bearing, and when the outer end of the handle is pressed downward perpendicular to its line of direction the lower end also is prevented from yielding upward by such metal bearing, so that there will be but a slight strain in the use of the plow upon the pin by which the handle is fastened to the land-side; and this construction is further useful in the formation of the strong quadrilateral, hereinafter more fully described, consisting of the rear part of the beam, the standard, the land-side, and the handle. These parts so mutually sustain each other as to resist the severest strain in the use of the plow, and, therefore, render any special brace between the beam and standard unnecessary, thus reducing the weight and cost of constructing the plow as well as increasing its strength. The third part of my invention relates to the construction of a peculiar fastening by which the handle is secured to the rear end of the beam. It consists of a flat head plate and two clamping-bolts, arranged and operated in such a manner as to make a secure and cheap fastening, and at the same time to secure the bolts and holes in the wood from exposure to the weather and consequently from decay from that cause.

SPECIFICATION.

Figure 2:
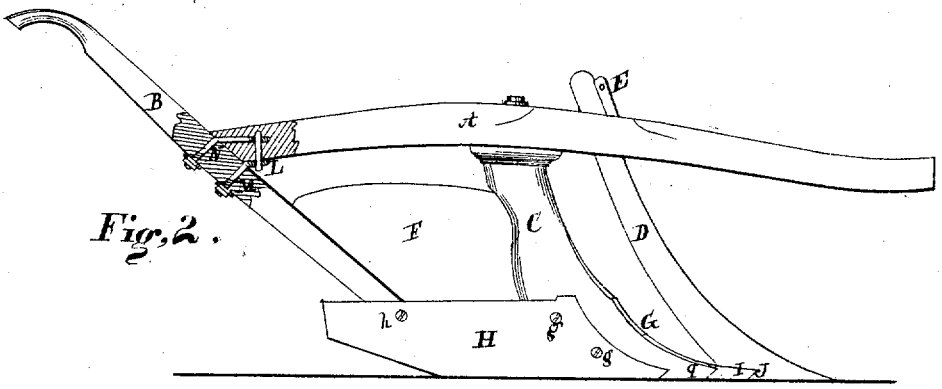
Figure 3:
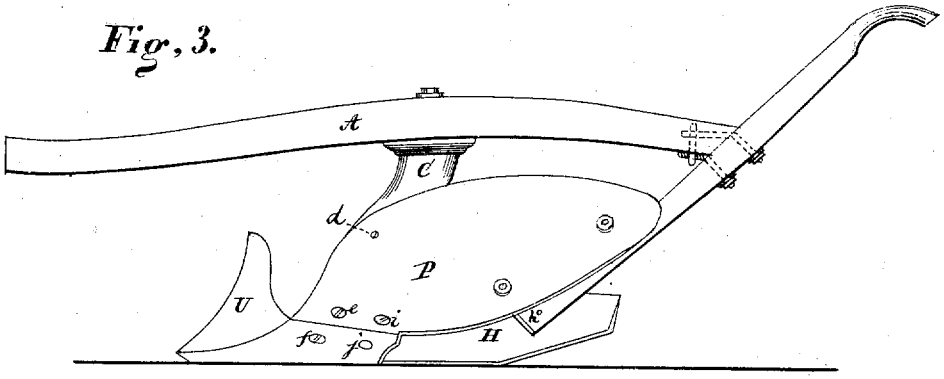
Figure 4:
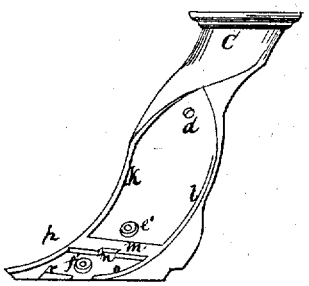
Figure 5:
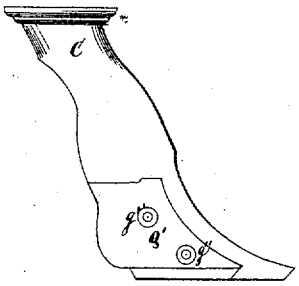
Figure 6:
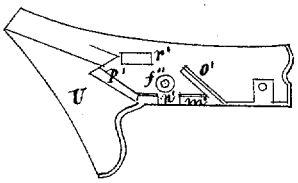
Figure 7:
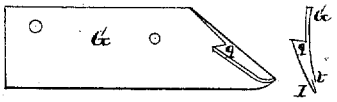
Figure 10:
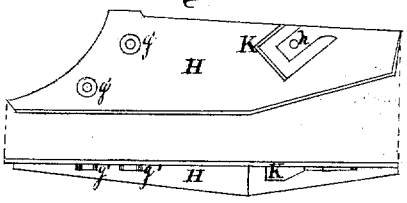
Figure 8:
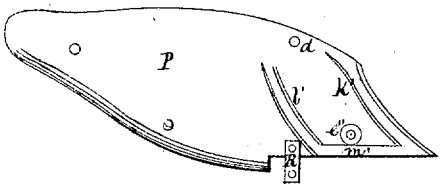
Figure 9:
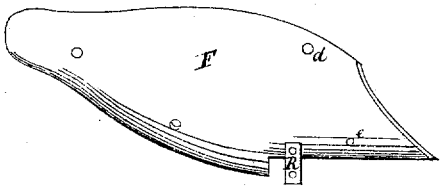
Figure 11:
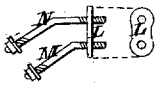
Figure 12:
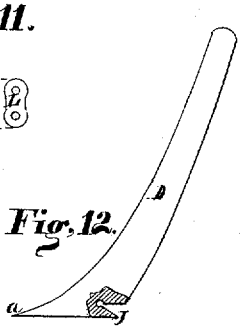

Figure 1 is a side view of a plow embodying my invention taken from the mold-board side. Figure 2 is a side view of the same taken from the land-side. Fig. 3 is a side view of the same, with cast-iron mold-board and share in position, taken from the mold-board side. Fig. 4 is a side view of the mold-board face of the plow-standard. Fig. 5 is a side view of the land-side face of the cast-iron share. Fig. 6 is a view of the bearing face of the cast-iron share. Fig. 7 are bearing face and end views of the cast-steel share. Fig. 8 is a view of the inner face of the cast-iron mold-board. Fig. 9 is a view of the inner face of the cast-steel mold-board. Fig. 10 are side views of inner face of land-side and plan of the same. Fig. 11 are details of fastening for securing end of beam to beam-handle. Fig. 12 is a detail view of colter.

The plow-standard C is cast of iron in the general form shown, and the land-side face Q is countersunk in its side, as shown. Around the faces of the mold-board and share are formed the raised flanges *k l m o p r*, as shown in Fig. 4, which are of a height just equal to the difference in thickness between the mold-board and share, of cast-iron, and those of cast-steel except the upper ends of the flanges *k* and *l*, where these flanges gradually taper down to a level with the face of the standard. The flange *m* has about double the width of any of the other flanges, and serves both as a seat for the upper edge of the cast-steel share and as a seat for the lower edge of the cast-steel mold-board. The notch $n$ is formed on the lower edge of the flange $m$, and the raised flange $e^1$ and $f^1$ are formed around the holes for the bolts $e'$ and $f'$, which secure the mold-board and share to the standard, as shown in Fig. 4. On the bearing face of the cast-iron mold-board P are formed the grooves $l'$ $m'$ $k'$ and the countersunk hole $e''$, as shown in Fig. 8, said grooves and hole corresponding in position and size with the flanges $l$ and $k$, and one-half of the flange $m$ and the flange $e^1$, so that when the mold-board P is placed on the standard C the flanges $l$ $m$ $k$ $e^1$ fit in the grooves $l'$ $m'$ $k'$ and holes $e''$, and thus prevent any movement of the mold-board on the standard, it being clamped thereto by the bolts $d$ and $e$, which pass through corresponding holes in the mold-board and standard, and are secured by screw-nuts on the inner side of the standard. On the bearing face of the cast-iron share U are formed the grooves $o'$ $m'$ $n'$ $p'$ $r'$ and the countersunk hole $f''$, as shown in Fig. 6, such grooves and holes corresponding in position and size with the flanges $o$, $m$, $p$, $r$, and $f^1$ on the standard C, and the raised portion $n'$, which divides the groove $m'$ on the share U into two parts, corresponding with the notch $n$ in the flange $m$ on the standard, so that when the share U is placed upon the standard C the flanges on the standard fit into the corresponding grooves and holes in the share and thus prevent any movement of the share on the standard, the bolt $f$ serving simply as a clamping-bolt to bind the share to the standard. The cast-steel mold-board F and share G are made without any grooves on their lower faces, and, when in position on the standard, rest on the faces of the flanges $k$ $l$ $m$ $o$ $p$ $r$ $e^1$ $f^1$, and as these flanges are just the height to make up the difference between the cast-iron and cast-steel parts, it is evident that the wearing faces of the cast-steel parts will occupy precisely the same position as that occupied by the wearing-surfaces of cast-iron parts, so that the "set" of the plow will not be affected by the change of either or both of these parts.

The same bolts $d$ and $e$ and $f$, which secure the cast-iron parts P and U to the standard C, also serve to secure the cast-steel parts F and G to the standard, and the strap R, with its bolts $i$ and $j$, is used in connection with both the parts P and U and the parts F and G to unite the rear edges of said parts in a manner common in former constructions. The flange could be divided by spaces into two or more parts, if desired, and the groove $l$ may be made in separate parts, to correspond, so as to avoid cutting out so much material across the face of the mold-board, and the raised flange $e^1$ could also be omitted; but this would be objectionable, as it would remove the points of support on which the cast-steel share is clamped by the bolt $e$, and said share would be liable to be sprung by the strain applied to the bolt. The cast-steel share G is made with lip $q$, which fits over the end of the standard C, as shown in Fig. 2, and the point I of the share G is beveled off on its under side, as shown in Figs. 1 and 2, and has its teat $t$ at its extreme end, and is shown in Fig. 7. The colter is notched out at its lower end and near corner, so as to form the strong hooked lip J, and the teat-hole T is formed at the head of this notch, as shown in Fig. 12. The hooked lip J hooks under the beveled end I of the share G, and the teat $t$ on the share fits in the hole T, as shown in Figs. 1 and 2. The upper end of the colter D being secured by the wedge E in a mortise in the beam A, it is seen that the tendency is to raise the colter from the share by the springing of the beam upward under a violent draft; but the hooked lip J prevents such raising of the colter, while the teat $t$ prevents the colter from springing sidewise out of position. By this construction the tie-brace formerly used to hold the forward end of the beam and the standards in their relative positions can be dispensed with, thus leaving a clear space under the beam, and preventing "choking up" while using the cast-iron share with the fluke-colter. The land-side H is of any ordinary form, and around the hole for the bolts $g$ $g$, which secure it to the standard C, are cast the raised flanges $g'$ $g'$, as shown in Fig. 10. These holes $g''$ $g''$ are countersunk around the bolt-holes in the standard C, and are of the same size as the raised flanges $g'$ $g'$ on the land-side H, so that when said land-side is placed in position on the standard the raised flanges $g'$ $g'$ fit in the holes $g''$ $g''$, and thus prevent any movement of the land-side on the face of the standard. The handle-flange K is cast on the inner face of the land-side H, around the upper side and end of the beam-handle B, which is secured to the land-side by the bolt H, as shown in Figs. 3 and 10. This handle-flange K serves the twofold purpose of preventing any sliding of the beam-handle down the face of the land-side by reason of the springing up of the front end of the beam, and of preventing the lower end of the beam-handle from being split by a downward pressure upon the upper ends of the handle, acting around the end of the beam as a fulcrum. The flat head-piece L of the handle-fastening is let up into a mortise cut in the under side of beam A, as shown in Fig. 2, and the bent clamping-bolts M and N are inserted at the end of the beam and screw into the head-piece L, the other end of said bolts extending through the handle B and being secured by nuts on the lower side, as shown in the drawing. Both the upper bolt N and head-piece L are kept below the upper surface of the beam A, so that the upper surface of said beam and the upper surface of the beam-handle form an unbroken surface, the result of which is that the end of the beam and the holes in the handle are protected from moisture and resulting decay.

I am aware that plow-standards have been before constructed in which a triangular depression was formed under the share and a corresponding raised piece was raised on the rear face of the share; and I make no claim to such depression and raised piece, as such construction is different in principle and much inferior to that herein specified, for the triangular depression on the standard was run out to nothing at the lower edge of the standard, so that over said lower edge the cast-iron share was raised its full thickness above the seat; and, as the cast-iron share could not be made as thin over the edge as the cast-steel share without making it too weak to be durable, it is evident that the wearing-surface of the cast-iron share would stand above the position occupied by the wearing-surface of the cast-steel share; as, for example, in the cylinder mold-board plow patented by Joshua Gibbs, August 15, 1854, if the wearing-surface of the cast-steel share were in the face of the cylinder-surface of the mold-board, the surface of the cast-iron share would be above it; or, in other words, by changing the shares, the wearing-surface on the furrow side would be distorted and the running and "set" of the plow would be changed; whereas in my construction I form a raised surface on the standard to support the cast-steel share in the same position as that occupied by the cast-iron share, thus effecting the desired result in a very efficient manner. I am also aware that fastenings have been before made for attaching the end of the beam to the beam-handle; and I lay no claim to such fastenings, except when made with a flat head-plate and two separate bent bolts, and arranged, as shown, underneath the surface of the beam, as hereinbefore specified.

*Claims.*

I claim as my invention—

1. The standard C, constructed with the raised flanges or projections *k l m*, in combination with the interchangeable mold-boards P, substantially as and for the purpose set forth.

2. The standard C, provided with raised flanges or projections *p m o r*, in combination with the share U having recesses or countersunk grooves *p′ m′ n′ o′ r′*, substantially as and for the purpose set forth.

3. The standard C, having raised flanges or projections on the seats for the mold-board and share, with corresponding grooves, holes, or recesses in the mold-board and share so arranged in relation to each other as to admit an interchangeable adaptation of mold-boards of sheet-steel and cast-iron of different thicknesses to the same standard, so arranged that the faces thereof shall be even with the connecting-share without affecting the "set" of the plow, as and for the purpose substantially set forth.

4. In the construction of plows the beam and handle fastening L M N, consisting of the flat head-plate L and bent clamping-bolts M N, and the several parts being constructed and arranged substantially as described.

MARTIN L. GIBBS.

Witnesses:
W. H. BURRIDGE,
CHARLES LEAVITT.